MANFRED DIETZE,
FRANZ HAUER, WOLFGANG KRAFT, HEINZ KUEHNE
INVENTORS.

MANFRED DIETZE,
FRANZ HAUER, WOLFGANG KRAFT, HEINZ KUEHNE
INVENTORS.

May 5, 1970     M. DIETZE ET AL     3,510,267
POLYCONDENSATION REACTOR
Filed Sept. 25, 1967     3 Sheets-Sheet 3

Inventors:
Manfred Dietze
Franz Hauer
Wolfgang Kraft
Heinz Kuehne
By Bair, Freeman & Molinare
Attys.

United States Patent Office 3,510,267
Patented May 5, 1970

3,510,267
POLYCONDENSATION REACTOR
Manfred Dietze, Offenbach am Main, Franz Hauer, Frankfurt am Main, Wolfgang Kraft, Bad Vilbel, and Heinz Kuehne, Oberhoechstadt, Taunus, Germany, assignors to Vickers-Zimmer Aktiengesellschaft Planung und Bau von Industrieanlagen, Germany
Filed Sept. 25, 1967, Ser. No. 670,343
Claims priority, application Germany, Sept. 24, 1966, V 32,011
Int. Cl. B01j 1/00
U.S. Cl. 23—285
10 Claims

ABSTRACT OF THE DISCLOSURE

A polycondensation reactor, particularly useful for the continuous, multistage polycondensation of polyesters such as polyethylene terephthalate, characterized by a container or vessel, with its principal axis aligned vertically, provided with a heat-exchange jacket, a feed pipe in the lid and a drain spout in the bottom, and with a vertical shaft pivoted therein. On the shaft are circular ring or annular disks and circular solid disks, disposed in coaxial and horizontal fashion and alternate with one another. The disks have torsional strength. The solid disks are at least the diameter of the open central sector of the circular ring disks. Stationary strippers rest on the disks in such a manner that the reaction substance is transported over the inner disk edge of the circular ring disks and is transported over the outer disk edge of the solid disks. Stationary mixing combs, product-guiding rings and a product distributor are also provided for each disk to assist in the transport of material.

SPECIFICATION

Field

This invention relates to a device for carrying out polycondensation reactions in the field of continuous production of linear high polymers, which is particular is useful for the final polycondensation reaction in the production of polyesters.

Background

As is well known, the production of film-forming and thread-forming polyesters began in the early 1940's with an invention which is described, for example, in German Pat. 972,503. According to that invention, highly polymeric polyesters are obtained through reaction of a glycol of the general formula HO(CH$_2$)$_n$OH with terephthalic acid, or a low aliphatic ester of the terephthalic acid, and subsequent polycondensation of the formed intermediate product. Polyethylene terephthalate produced out of ethylene glycol and dimethyl terephthalate via the ester-interchange intermediate product bis-2-hydroxy-ethyl-terephthalate has attained special economical importance. Polyester fibers of polyethylene terephthalate are known under one trademark as "Dacron."

Although today the production of polyesters in batches on a large industrial scale is essentially mastered and therefore represents the method by far preferred, the conversion of the process into a continuous mode of operation, which is per se desirable because of the obvious disadvantages of the batch process, has resulted in very considerable difficulties. Only most recently can tendencies toward the use of continuous processes on the technological scale be found. The reason for the only recent use of continuous processes is due to such processes requiring a precise observation of a series of reaction parameters, some of which have to be changed continuously with the progressing degree of polycondensation in accordance with a particular schedule—such as, for example, pressure and temperature—over a long period of time in order to attain a product of continuously high quality. Particular difficulties also result because of the necessity of (1) maintaining residence time or duration as constant as possible in the case of narrow residence time ranges or spectrum, (2) causing the evaporation of released reaction products within as short a period of time as possible, (3) providing a good, intimate mixture of the reaction substance while continuously renewing the surface, particularly during the polycondensation, and (4) maintaining a constant reagent concentration and catalyst concentration.

As a rule, continuous processes for polyester production known in the patent literature, for example, U.S. Pat. 2,727,882; 2,933,476; 3,054,776 and 2,973,341, are designed in multistage manner. The continuous process described in our copending patent application Ser. No. 460,499, filed June 1, 1965, and now U.S. Pat. No. 3,483,942 already successfully tried out on a large technical scale, operates with one ester-interchange stage and two or three polycondensation stages. In view of the above mentioned requirements for a continuous production process, it is evident that considerable effort has to be attributed to the development of each of the reactors being used for the different stages in order to achieve a successful technical execution of a continuous process. This is particularly true for the last polycondensation reactor, by means of which one can influence the product quality for the last time during the final polycondensation reaction.

U.S. Pat. 2,758,915 discloses a device for the execution of the final polycondensation reaction which consists of a casing having two shafts disposed therein a horizontal, parallel fashion relative to one another, and which are driven in opposite directions. On the shafts are a multitude of concentric flat solid disks or sieve disks arranged in such a manner that the disks of the two interacting shafts engage while forming a labyrinth-like flow route. The disks of this device do, indeed, provide a continuous surface renewal of the reaction substance and a large product surface favorable for the residual glycol evaporation. However, due to the flow route being continuous without interruption over the reactor length, the maintenance of a narrow residence time range is not possible because undesired return mixtures in axial direction of the reactor can occur. On the other hand, having a wide residence time range will preclude a degree of polymerization of the individual polymer particles which is as uniform as possible, and will preclude therewith a homogeneous quality product. A further disadvantageous effect in terms of product quality results from the fact that on the surfaces of the disks which necessarily do not touch one another, very large periods of dwell occur which can result in a cracking or degradation of the reaction substances and thereby contaminate the product. Another disadvantageous feature of this reactor is the lack of a forced conveyance of the reaction substance in the reactor itself, and thereby no defined residence time can be attained because of the existing high viscosity of the reaction substance. Our French Pat. 1,351,484, discloses a polymerization device in which several wormgear shafts, driven in the same direction, are disposed in a casing in horizontal, parallel fashion relative to one another, and are geared tightly into one another. By this construction the disadvantages of the above-described device of U.S. Pat. 2,758,915 are, indeed, avoided because the tightly interlocking worms prevent axial remixing, automatic flank cleaning and case cleaning by the worms prevent product crackings or degradations from forming, and because the worms, tightly gearing into one another, convey the reaction substance by force through the reactor space. Although this device operates in very satisfactory manner for the attaining of homogeneous products in those respects, it is a very expensive and mechanically complicated machine. The very considerable production difficulties for large worms and the high production costs caused thereby make the production of such worm reactors for large rates of flow or large capacities unfeasible from a practical point of view.

The INVENTION

Objects

It is among the objects of the present invention to construct a polycondensation reactor that operates continuously while avoiding the disadvantages of known devices, in such a manner that it maintains a narrow residence time range and a continuous cleaning of the essential surfaces touched by the product, and therewith a high product homogeneity by means of a device simple in its construction and economically feasible. Other objects will be evident from the following description.

Summary

The polycondensation reactor of this invention which is provided to solve the above-described task, is characterized by a container or vessel, with its principal axis aligned vertically, provided with a heat-exchange jacket, a feed pipe in the lid and a drain spout in the bottom, and with a vertical shaft pivoted therein. On the shaft are circular ring or annular disks and circular solid disks, disposed in coaxial and horizontal fashion and alternate with one another. The disks have torsional strength. The solid disks are at least the diameter of the open central sector of the circular ring disks. Stationary strippers rest on the disks in such a manner that the reaction substance is transported over the inner disk edge of the circular ring disks and is transported over the outer disk edge of the solid disks. Product-guiding rings are also provided for each disk.

By this arrangement, the reaction substance is forced by the strippers from disk to disk from the top to the bottom through the reactor. Independent of the rate of revolutions of the shaft and the layer thickness on the disks, adjustable residence times are defined. Because of the multitude of the disks, narrow residence time ranges result. The section takes place in a favorable manner in thin layers with a large reaction substance surface, whereby both the evaporation of the remaining glycol and the reaction cycle are advantageously accelerated. Uncontrollably long residence time of the reaction substance on the disks, and product damages due to cracking or degradation are relatively impossible because at every revolution each disk respectively is cleaned once by a stripper before new reaction substance is put onto the disk from the disk lying just above it. According to the invention, although the reactor is simple in its construction and operates reliably in service, it yields homogeneous polycondensation products of high quality and is of considerably lower manufacturing cost as compared to other devices for a comparable purpose.

To adjust the layer thickness of the reaction substance on the disks, one can advantageously provide, the proximity of the strippers, stationary distributors which provide a uniform coverage and feeding of the individual disks. The distributors are disposed parallel to, and a small distance from, the upper surfaces of the disks, and are generally parallel to and behind the strippers in the direction of the rotation. They may be constructed in such a manner they they can be adjusted with regard to height, thereby rendering possible the adjustment of the layer thickness in the manner of a doctor blade.

As a further feature of the invention, a thorough mixing of the reaction substance on the disks can be provided by stationary mixing combs disposed adjacent to the upper surfaces of the disks. These mixing combs continuously tear open the surface of the thin layers and thereby continuously expose a new reaction substance surface on the disks.

Detailed Description and Exemplary Embodiment

Further details of the invention are described with reference to the following drawings which show one embodiment. In the drawings.

Figure 1:
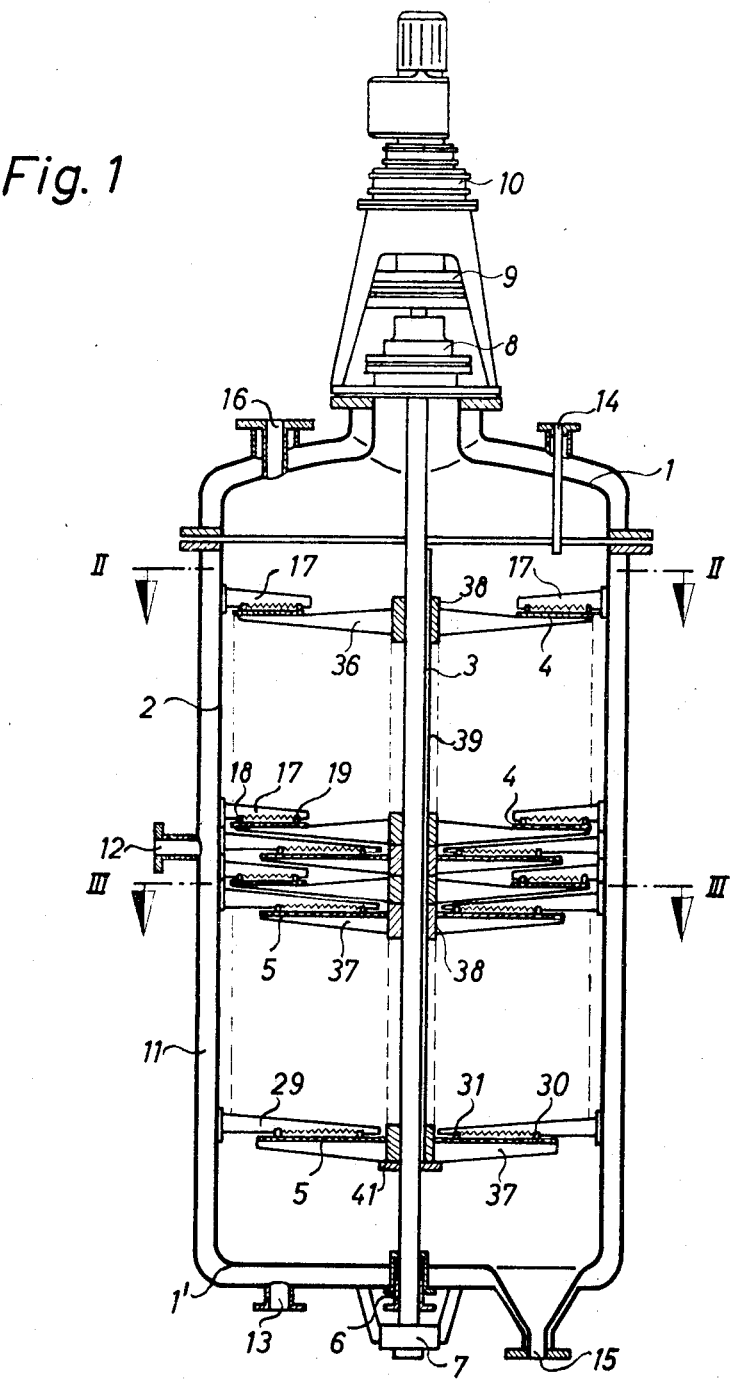
FIG. 1 shows a longitudinal section of one embodiment of the reactor according to the invention.

Referring first to FIG. 1, the reactor is in the form of a container which essentially is formed by an upright cylinder 2, a flange-connected lid 1 and a bottom 1'. Shaft 3, centrally disposed in the main axis of the container, carries a multitude of alternating circular ring disks 4 and circular solid disks 5, respectively, of which only a few disks 4, 5 are shown in FIG. 1 for reasons of simplification. At its lower end, shaft 3 is led through the container bottom 1' in tightly sealing manner, for example, by means of a packing box 6, and is pivoted in a bearing 7. At the upper end a sealed-off shaft passage 8 and an accompanying bearing 9 are also provided. The driving of the shaft takes place by means of a drive unit 10 which is adjustable with regard to its rate of rotation. The container is surrounded on all sides by a heat exchange jacket 11, which has an inlet pipe connection 12 and an outlet pipe connection 13 for the heating medium. A feed connection 14 for the reaction substance is provided in the lid 1. In the bottom 1', a drain spout 15 for the product is provided. The drain spout 15 is constructed in such a manner that a conventional discharge worm for the removal of the formed product can be connected thereto. The vapors set free during the reaction are removed from the container through a vapor-removal connection 16 which is connected to a vacuum source.

Figure 2:
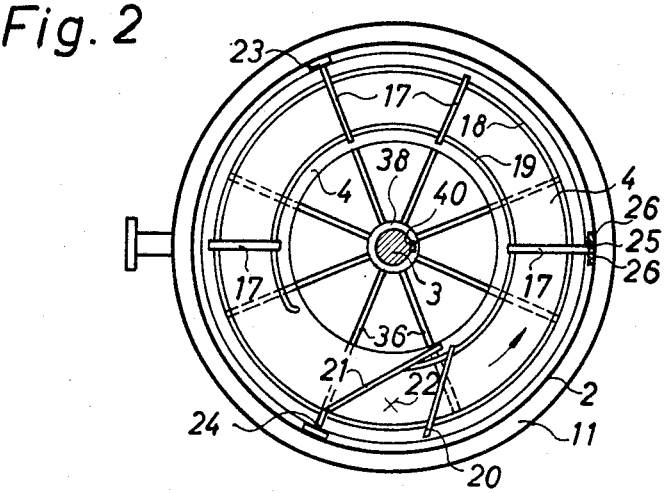
FIG. 2 shows a cross section of the reactor along line II—II of FIG. 1.

In the embodiment shown, a multitude of mixing combs 17 are assigned to each circular ring disk 4, as best seen in FIG. 2. Furthermore, for every ring disk 4, stationary product-guiding rings 18 and 19 are provided in the proximity of their edges. The mixing combs 17 are rigidly connected to these product-guiding rings. In addition, a distributor 20 and a stripper 21 are attached to the product-guiding rings. Beyond the outer ring 18, three spacers 23, 24 and 25 are disposed (1) to center the ring construction consisting of the rings 18 and 19, the mixing combs 17, the stripper 21 and the distributor 20, and (2) to support the ring construction at the inner wall of the container. The spacer 25 is held in perpendicular rails 26 at the inner wall of the container so that twisting of the ring construction is not possible.

The delivery of the reaction substance onto the ring disk 4 takes place at the place marked 22. The ring disk turns in the direction of the arrow shown in FIG. 2. The distributor provides a uniform distribution of the product between the product-guiding rings 18 and 19. Through appropriate means it can be set-up at the described ring construction in such a manner that it is vertically adustable to control the layer thickness. The mixing combs 17 dip into and engage the surface of the reaction-substance layer and tear it open. For this purpose, the comb teeth can be constructed in suitable manner according to the viscosity of the reaction substance to be treated. For example, the number of the teeth could be in inverse proportion to an increase in viscosity, and the spacing and shape of the teeth can be varied to produce the desired surface combing action of opening and agitation. After aproximately one disk revolution, the reaction substance is scraped off the ring disk 4 by the diagonally disposed stripper 21 and transported over the inner disk edge and flows onto the solid disk 5 located underneath. For this purpose, the inner ring 19 terminates at a distance before the stripper 21 while the outer ring 18 is constructed as closed ring.

Figure 3:
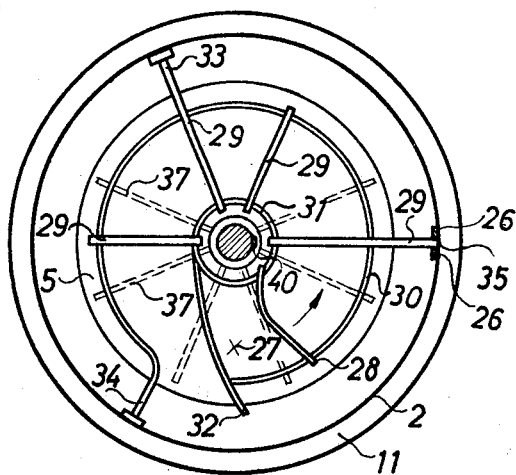
FIG. 3 shows a further cross section of the reactor corresponding to line III—III of FIG. 1.

The solid disk 5 seen in FIG. 3 possesses a diameter which is considerably smaller than the outer diameter of the ring disks 4, but which is of the same size as, or larger than, the diameter of the circular open central sector of the ring disks 4. Provided for the solid disks 5 are, respectively, a distributor 28, several mixing combs, 29, an opened outer product-guiding ring 30, a closed inner product-guiding ring 31 and a stripper 32. Furthermore, three spacers 33, 34 and 35 are present, of which the spacer 35 is guided, just like the spacer 25 of the ring disks 4, with torsional strength in the perpendicular rail 26 at the inner wall of the container. In this case too, the product-guiding rings 30 and 31, mixing combs 29, stripper 32 and distributor 28 form a correlated ring construction combination. Also, the distributor 28 can be made vertically adjustable.

As an alternative embodiment, the closed product-guiding rings 18 and 31 can be secured to disks 4 and 5, for example, by welding, and turn with them. In this embodiment, no solid connection exists between the product-guiding rings 18 and 31 and the accompanying mixing combs, strippers, distributors, or, in the case of rings 18, the spacers.

As indicated by the arrow in FIG. 3, the solid disk rotates in the same direction as the ring disk 4 described in relation to FIG. 2. The product is supplied at the place marked 27, and after approximately one revolution is transported by the stripper 32 over the outer edge of solid disk 5 onto the next lower ring disk 4.

Disks 4 and 5 are attached to supporting arms 36 and 37 which in turn are attached to hubs 38. These hubs are provided with an inner groove or keyway 40 by means of which they are strung onto shaft 3 equipped with an appropriate key 39, thus imparting torsional strength to the hub and arm. Key 39 can be laid into a groove of the shaft. Because of the stringing construction, the assembling and the dismantling of the reactor according to the invention does not cause any difficulties for disks 4 and 5 as well as for the ring constructions which may rest of their own weight on the disks. All of the disks and ring constructions are carried by a flange 41 attached at the bottom end of the shaft.

Figure 4:
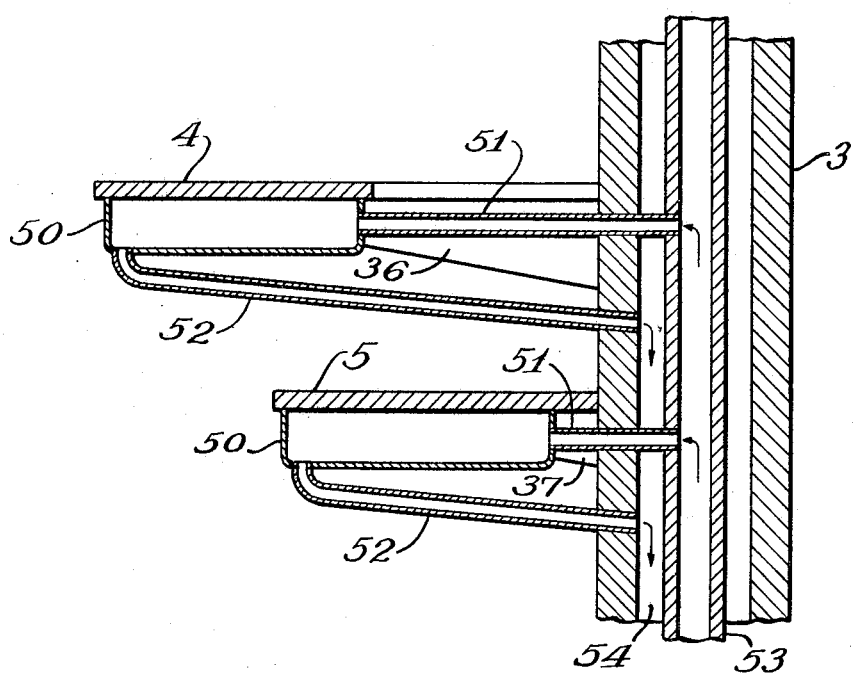
FIG. 4 is a cross section of disk heating means.

As seen in a further embodiment shown in FIG. 4, where a direct heating of disks 4 and/or 5 is desired, the disks can be provided with heat-exchange chambers on their bottom surfaces, for example, super-imposed half tubes 50 which are connected with feed channels, tubes or conduits 51 and drain conduits 52. These channels can be disposed along the support arms 36 and 37, or within them, and open into shaft 3 which in this latter case is constructed as hollow shaft. Disposed coaxially within hollow shaft 3 is a hollow shaft 53 for the input of a suitable heating medium as shown by the arrows. The annular space 54 defined between shaft 53 and the inner wall of hollow shaft 3 transports heating medium out from drain conduits 52. The hub and key construction 38, 39, 40 can be used, with appropriately positioned bores in the hubs to connect the feed and drain conduits with the corresponding shaft and annular space respectively.

The mode of operation of the reactor of this invention is described with reference to an example of a 3-metric-ton-per-day reactor for the final polycondensation of a prepolycondensate in the production of polyethylene terephthalate. As described, the precondensate is continuously fed onto the upper ring disk 4 through the supply pipe 14. According to the degree of polymerization attained in the preceding reactors, the intrinsic viscosity of the precondensate can lie between approximately 0.3 and 0.7. As a rule, the temperature of the precondensate is between about 260 and 280°, chiefly 270° C. Through the feed pipe 12, diphenyl vapor with a saturated steam temperature of approximately 300° C. is fed to the heating jacket 11, and the condensate formed leaves the heating jacket through pipe 13. The glycol vapors released during the reaction are drawn off through pipe 16 which is connected with a steam jet assembly for maintaining an operating vacuum between approximately 0.1 to 2 torr, preferably 0.5 torr. Shaft 3 is driven by the drive unit at only a low rate of rotation of approximately 0.5 revolution per minute.

In a run using ten solid disks 5 and ten ring disks 4 with a layer thickness of 5 mm. on the disks, an average period of dwell of approximately one hour results for the 3-ton-day reactor in question at the above-mentioned rate of rotation. After this period of time, the stripper 32 of the lower solid disk 5 transports the product into the removal pipe 15, from which it is continuously removed by a discharge worm (not shown in the drawing) and formed by the direct spinning process into threads or films, or is supplied for the productions of polyester chips. According to the operating conditions, a viscosity increase between approximately 0.2 and 0.4 ($\eta$ intr.) results between the supplied reaction substance and the drawn-off product. The dimensions of the described 3-metric-ton-per-day reactor are approximately:

1.7 m. for the inner diameter of the container,
4.0 m. for the container height,
1.55 m. for the outer diameter of the ring disks, and
1.25 m. for the outer diameter of the solid disks.

In addition to the utility especially emphasized above, the reactor of this invention is fundamentally suitable for all chemical reactions in which a viscous reaction substance exists. Further, applicability for use with granular materials, for example in drying processes, is also contemplated. The adjustability of the period of dwell through variation and control of the rate of rotation and layer thickness is a special advantage of the device of this invention. In addition to the jacket type heating, heat input by use of a countercurrent gaseous heat carrier can be provided in which heated gases are lead from the bottom to the top of the reactor in a direction of flow opposite to the product flow.

We claim:
1. A polycondensation reactor comprising in combination:
   (a) means defining a tubular reactor vessel having a bottom and a top, said vessel being aligned with its principal axis vertical,
   (b) means for exchanging heat with the contents of said reactor vessel,
   (c) means defining a feed pipe communicating with the interior of said vessel disposed through said top,
   (d) means defining a drain pipe communicating with the interior of said vessel disposed through said bottom,
   (e) a rotatable shaft disposed coaxially in said vessel,
   (f) means defining annular ring disks,
   (g) means defining circular disks,
      said annular and circular disks being disposed horizontally and mounted coaxially on said shaft,
      said annular and circular disks alternating with one another on said shaft,
      said circular disks having a diameter at least as great as the diameter of the open central sector of said annular disks, and
   (h) means defining rotationally stationary strippers disposed to rest on said disks so that the reaction substance is transported over the inner edge of each annular disk and over the outer edge of each circular disk.

2. A reactor as in claim 1 which includes:
   (i) means defining rotationally stationary distributors disposed substantially parallel to said strippers, and behind said strippers in the direction of rotation, and disposed parallel to and spaced from the upper surfaces of said disks.

3. A reactor as in claim 1 which includes:
(j) means defining rotationally stationary mixing combs disposed adjacent to the upper surfaces of said disks for continuously exposing a fresh surface in reaction substance on said disks.

4. A reactor as in claim 1 which includes:
(k) means defining inner and outer rotationally stationary product-guiding rings disposed concentric to each other, and disposed to rest on each of said disks adjacent the respective inner and outer periphery of said disks,
said inner rings of said annular disks and said outer rings of said circular disks being open rings, commencing, in the direction of revolution, just behind said strippers, and terminating a distance in front of said strippers,
said outer rings of said annular disks and said inner rings of said circular disks being closed rings.

5. A reactor as in claim 1 which includes:
(k) means defining inner and outer concentric prduct-guiding rings secured to each of said disks disposed adjacent the respective inner and outer periphery of said disks,
said inner rings of said annular disks and said outer rings of said circular disks being open rings, commencing, in the direction of revolution, just behind said strippers, and terminating a distance in front of said strippers,
said outer rings of said annular disks and said inner rings of said circular disks being closed rings.

6. A reactor as in claim 1 wherein said heat exchange means includes:
means defining jacket spaced from the outer walls of said vessel for receiving a heat-exchange fluid therebetween.

7. A reactor as in claim 1 wherein:
said shaft is hollow, and
said heat exchange means includes:
means defining chambers disposed on the undersurfaces of said disks,
means defining feed and discharge conduits communicating with said chambers via said hollow shaft.

8. A reactor as in claim 1 wherein:
said disks are mounted on said shaft by means of hubs attached to arms secured to the underside of said disks,
said hubs being rotatably secured to, and axially movable on, said shaft, thereby to give torsional strength to said disks while permitting simple assembly and removal.

9. A reactor as in claim 1 which includes:
(i) means defining rotationally stationary distributors disposed substantially parallel to said strippers, and behind said strippers in the direction of rotation, and disposed parallel to and spaced from the upper surfaces of said disks,
(j) means defining rotationally stationary mixing combs disposed adjacent to the upper surfaces of said disks for continuously exposing a fresh surface in reaction substance on said disks,
(k) means defining inner and outer rotationally stationary product-guiding rings disposed concentric to each other and disposed to rest on each of said disks adjacent the respective inner and outer periphery of said disks,
said inner rings of said annular disks and said outer rings of said circular disks being open rings, commencing, in the direction of revolution, just behind said strippers, and terminating a distance in front of said strippers,
said outer rings of said annular disks, and said inner rings of said circular disks being closed rings, and
wherein said heat exchange means includes:
means defining a jacket spaced from the outer walls of said vessel for receiving a heat-exchange fluid therebetween.

10. A reactor as in claim 9 wherein:
said mixing combs, said distributors and strippers are secured to said inner and outer product-guiding rings to form a ring construction,
said ring construction being centered with respect to said shaft, and spaced from the inner wall of said vessel by spacer elements,
and including:
(e) means defining vertical rails disposed on the inner wall of said vessel parallel to the main axis of said vessel, and
said spacer elements are trsionally and rotationally, stationarily supported by said rail means.

References Cited

UNITED STATES PATENTS

| | | |
|---|---|---|
| 1,732,805 | 10/1929 | D'Yarmett. |
| 2,073,026 | 3/1937 | Renfrew et al. |
| 2,636,555 | 4/1953 | Klepetko et al. |
| 2,686,110 | 8/1954 | Carver _____ 23—285 |
| 2,800,411 | 7/1957 | Church. |
| 3,157,619 | 11/1964 | Bell et al. |
| 3,254,070 | 5/1966 | Roelen _____ 23—285 X |
| 3,271,272 | 9/1966 | Watt. |

MORRIS O. WOLK, Primary Examiner

B. S. RICHMAN, Assistant Examiner

U.S. Cl. X.R.

159—15, 25; 260—75